United States Patent
Maeder

(10) Patent No.: US 6,488,212 B1
(45) Date of Patent: Dec. 3, 2002

(54) SYSTEM FOR IDENTIFYING AND LOCATING RELATIVE POSITIONS OF OBJECTS

(75) Inventor: Carl Conrad Maeder, Hinwil (CH)

(73) Assignee: Ferag AG, Hinwil (CH)

( * ) Notice: Subject to any disclaimer, the term of this patent is extended or adjusted under 35 U.S.C. 154(b) by 0 days.

(21) Appl. No.: 09/414,287

(22) Filed: Oct. 7, 1999

Related U.S. Application Data

(62) Division of application No. 08/905,571, filed on Aug. 1, 1997, now Pat. No. 5,992,739.

(30) Foreign Application Priority Data

Aug. 9, 1996 (CH) .............................................. 1955/96
Aug. 28, 1996 (CH) .............................................. 2118/96

(51) Int. Cl.⁷ .............................................. G06K 19/06
(52) U.S. Cl. ...................................... 235/494; 235/385
(58) Field of Search ................................. 235/376, 380, 235/383, 385, 384, 470, 492, 451; 343/741, 742, 788, 866, 867, 700 MS

(56) References Cited

U.S. PATENT DOCUMENTS

| | | | |
|---|---|---|---|
| 3,832,530 A | * 8/1974 | Reitboeck et al. | 235/439 |
| 4,992,799 A | 2/1991 | Garay | 343/702 |
| 5,155,493 A | 10/1992 | Thursby et al. | 343/700 |
| 5,340,968 A | * 8/1994 | Watanabe et al. | 235/380 |
| 5,406,263 A | * 4/1995 | Tuttle | 340/572.1 |
| 5,485,166 A | 1/1996 | Verma et al. | 343/744 |
| 5,491,483 A | * 2/1996 | D'Hont | 342/42 |
| 5,541,574 A | 7/1996 | Lowe et al. | 340/447 |
| 5,566,441 A | 10/1996 | Marsh et al. | 29/600 |
| 5,742,256 A | 4/1998 | Wakabayashi | 343/718 |
| 5,786,626 A | 7/1998 | Brady et al. | 257/673 |
| 5,929,760 A | * 7/1999 | Monahan | 340/572.7 |

FOREIGN PATENT DOCUMENTS

| | | |
|---|---|---|
| EP | 0 565 022 | 10/1993 |
| JP | 6-244619 A * | 9/1994 |
| JP | 9-110150 A * | 4/1997 |
| WO | WO 93/12513 | 6/1993 |
| WO | WO 96/10803 | 4/1996 |

* cited by examiner

Primary Examiner—Michael G. Lee
Assistant Examiner—Jared J. Fureman
(74) Attorney, Agent, or Firm—Rankin, Hill, Porter & Clark LLP

(57) ABSTRACT

The invention concerns a movable object, e.g. a roll of printed products (1) with a winding core (2) onto which printed products are wound with the help of a winding tape (3). The inventive movable object carries data stored in an integrated circuit (23) and an antenna, whereby the data can be read or overwritten respectively without contact by a reading/writing device with a main reading direction (L). The antenna is designed as an antenna loop (5) with a gap, whereby the ends of the loop (5) are contacted with the integrated circuit which is e.g. arranged on a connecting piece and whereby an antenna area is defined by the antenna loop (5). The object is position able relative to the reading/writing device (10) such that the main reading direction (L) penetrates the antenna area vertically or obliquely.

8 Claims, 5 Drawing Sheets

SYSTEM FOR IDENTIFYING AND LOCATING RELATIVE POSITIONS OF OBJECTS

CROSS-REFERENCE TO RELATED APPLICATION

This application is a division of application Ser. No. 08/905 571, filed Aug. 1, 1997, which issued as U.S. Pat. No. 5,992,739 on Nov. 30, 1999.

FIELD OF THE INVENTION

The invention concerns a movable object carrying data to be read without contact or to be overwritten without contact by a reading/writing device having a main reading direction.

BACKGROUND OF THE INVENTION

In the most varied areas of applications such as fabrication, maintenance, analysis, stock keeping etc. it is desired more and more to equip movable objects with automatically readable identification means. Such identification means is e.g. used for automatic identification of the objects. Automatically readable identification means are e.g. markings readable with optical means or electronically stored data.

Optical markings are e.g. bar codes. Reading of such optical identification means is carried out without contact, whereby a reading distance and a reading angle must be maintained within a given range and whereby the marking must be visible, i.e. not separated from the reading equipment by a non-transparent medium.

Electronically stored data is e.g. stored in a suitable integrated circuit which circuit is attached to the object to be identified. For reading the stored data, this kind of circuit is contacted by a reading device or by a probe of such a device or it comprises an antenna and the stored data are read without contact by a appropriately equipped reading device. Circuit, antenna and reading device can be designed such that the data which is stored in the circuit can not only be read by the device but can also be overwritten (reading/writing device) and also such that the energy required in the circuit for reading or overwriting is transmitted from the device to the circuit without contact such that no special source of energy (e.g. battery) is required for the circuit on the movable object.

In contrast to the optical markings, electronically stored data can take over a controlling function as well as an identifying function, i.e. with the help of such data suitably equipped devices can be triggered directly.

For data communication with contact, the reading/writing device and the object are to be brought into a precisely defined relative position. Data communication without contact is possible in more or less freely selectable relative positions of object and reading/writing device depending on the design of circuit, antenna and reading/writing device. However, in a system with a large freedom concerning the position of the reading/writing device it is more difficult or no longer possible without further means to restrict the data communication to one specific object or to functionally couple a locality with an object (for localizing objects and/or for control functions to be taken over by objects being present in one specific position).

SUMMARY OF THE INVENTION

An object of the invention is to provide objects carrying electronically stored data such that the data can be read and/or overwritten without contact, wherein a large freedom concerning relative positions of a reading/writing device and the object is to be guaranteed and whereby it is to be possible to note and to functionally use a present position of the object.

The inventive movable object comprises an integrated circuit in which data is electronically storable and an antenna. The antenna substantially consists of a conductive loop (antenna loop) which is closed by the integrated circuit and defines an antenna area. For a writing or reading process, the object is positioned relative to a reading/writing device with a main reading direction such that the main reading direction of the device penetrates the antenna area vertically or obliquely (is not arranged parallel to this area), whereby during the writing/reading process object and reading/writing device are stationary or move relative to each other.

The antenna loop or the antenna area respectively is designed and positioned on the object such that a reading/writing process carried out by a specific reading/writing device is possible for as many equivalent positions of the movable object as possible without having to change the main reading direction of the reading/writing device. This means that a substantially unchanged main reading direction penetrates the antenna area of the object regardless of the specific one of a plurality of equivalent positions the object is presently in. Equivalent positions of objects are to be understood as a plurality of positions in which the object can be found in a reading/writing locality for reasons not concerning the reading/writing process.

The conductive loop can be designed such that it is only closed for specific configurations of the object, i.e. that the data of an object can only be overwritten or read respectively as long as the object has one of these specific configurations.

BRIEF DESCRIPTION OF THE DRAWINGS

Examples of embodiments of the inventive movable object and advantageous embodiments of antennae for such objects are described in detail in connection with the following drawings wherein.

DESCRIPTION OF PREFERRED EMBODIMENTS

Figure 1:
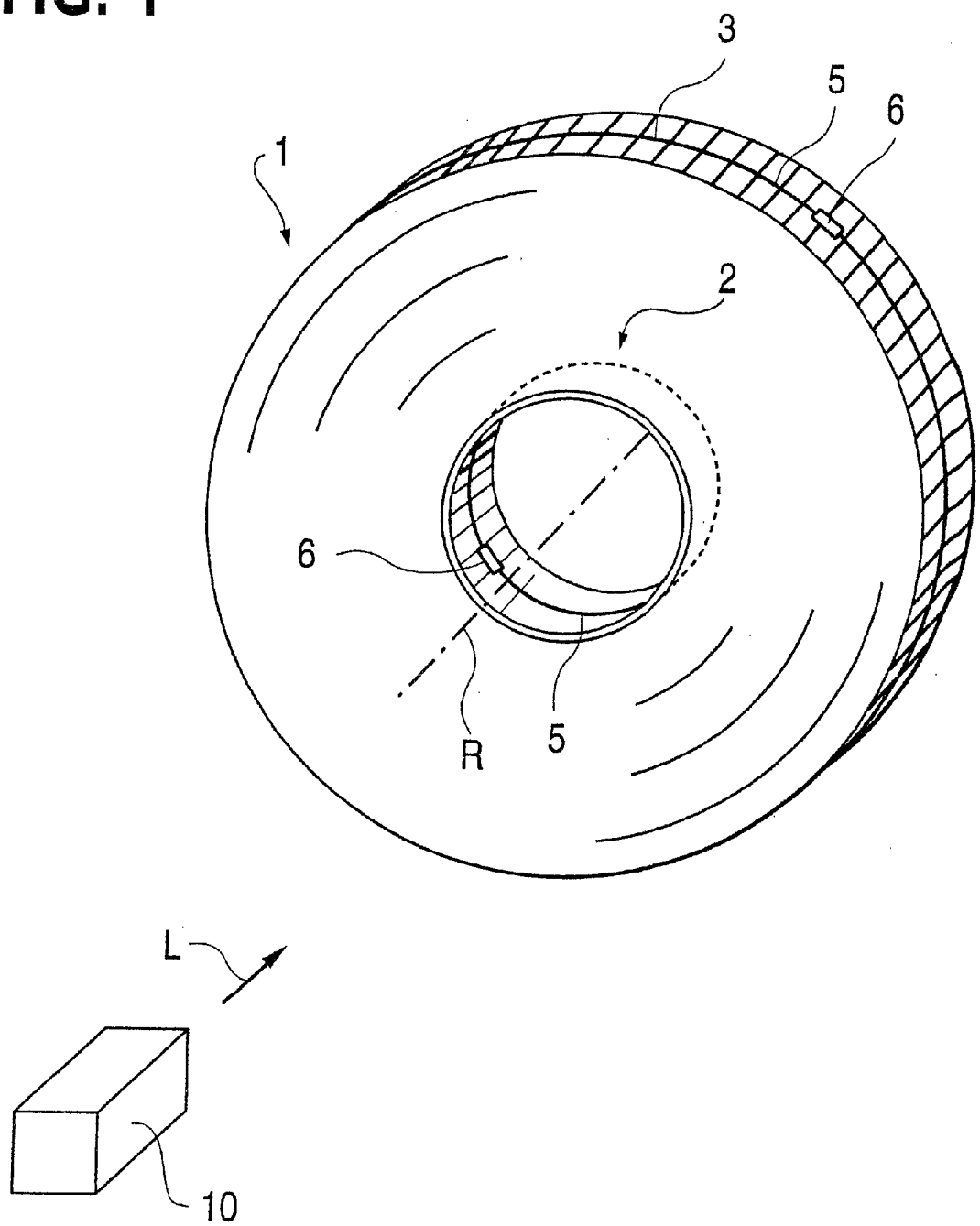
FIG. 1 is an exploded schematic perspective view of a roll of printed products with an integrated circuit and an antenna as an example of an embodiment of the inventive object.

FIG. 1 shows a roll 1 of printed products as an embodiment of the inventive movable object. Such rolls are used often as storage formations during the processing of printed products. Roll 1 comprises a substantially cylindrical hollow winding core 2 which is usually made of plastic and onto which the printed products are wound with the help of a winding tape 3.

Such winding cores are substantially rotationally symmetric relative to their axis R. They are e.g. positioned by gripping them in the region of the winding core (rotation axis substantially horizontal), by laying them down with vertical rotation axis and stacking them coaxially on top of each other or by leaning them on a support individually or in groups with the rotation axis slightly oblique relative to the horizontal. In all these cases the rotational position relative to the rotation axis at least of the core or of the end of the wound tape is irrelevant, i.e. in all these cases infinitely many equivalent rotational positions are possible. The antenna area of such a roll must be designed such that it does not change its position by rotation of the roll or only in as much as it is penetrated by a constant main reading direction of a reading/writing device in every one of the possible rotational positions.

In FIG. 1 two examples of possible designs of antenna loops are shown, wherein one of them extends around the outer circumference of the roll (e.g. integrated in the winding tape) and the other one extends around the outer or inner core circumference or is integrated into the core material.

The antenna loop 5 is an electrical conductor the ends of which are positioned on both sides of a gap and are conductively connected to the integrated circuit and possibly to further electronic functional elements (e.g. condenser for modulation or energy storage or damping resistor). The integrated circuit and the further elements are advantageously arranged directly in the gap between the ends of the loop, e.g. on a corresponding connecting piece 6.

The antenna loop consists e.g. of a wire or cable or of a metal tape which is arranged substantially perpendicular to the antenna area defined by the antenna.

FIG. 1 shows diagrammatically a reading/writing device 10 the main reading direction L of which is arranged perpendicular or oblique and centric or eccentric relative to the antenna area defined by antenna 5. As long as the antenna area is penetrated by the main reading direction L a reading or writing process respectively is possible, whereby the energetic conditions are adjustable such that a second roll, which is e.g. positioned coaxially to the roll of FIG. 1 and behind it (such that L also penetrates its antenna area) is not concerned by the writing or reading process respectively (no crosstalk).

Variants of the antenna loops shown in FIG. 1 are antenna loops arranged on the core or tape such that they do not define an even antenna area perpendicular to the rotation axis of the core but an antenna area which may be not even and/or may be oblique relative to the faces of the roll.

Figure 2:
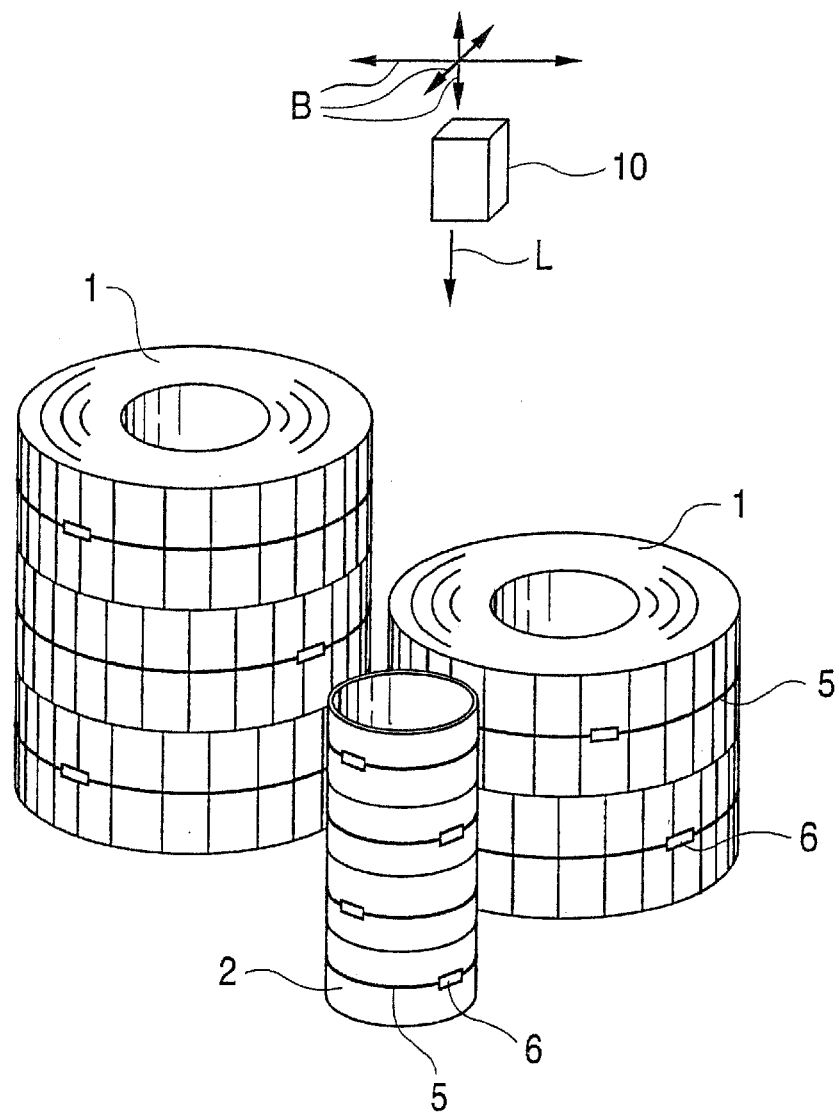
FIG. 2 is a schematic perspective view of a plurality of stored rolls of printed products and winding cores and a reading/writing device.

FIG. 2 shows an example of storage of rolls 1 of printed products, all equipped with antenna loops 5 and connecting pieces 6 each arranged on the outermost end of the winding tape. The rolls are stacked on top of each other in any coaxial rotation position, the stacks being arranged side by side. Empty winding cores 2 with winding tapes wound on them are stored in the same manner.

FIG. 2 also shows a reading/writing device 10 with a main reading direction L which is orientated substantially perpendicular to the antenna areas of the rolls 1 and the winding cores 2. The reading/writing device 10 is, as indicated by arrows B, movable horizontally and vertically and is especially movable into the cavities of the cores of the stacks. It can also be fixed directly to a gripper for gripping rolls and winding cores.

As the antenna areas of the rolls and winding cores stacked on top of each other are not only orientated in parallel but relative to the reading direction are also exactly superimposed crosstalk between winding cores of different stacks is not possible even if the stacks are arranged extremely near to each other as is the case with empty cores. The antenna areas of the rolls or winding cores of one individual stack are clearly separated by the distance between them such that crosstalk within the stack can easily be prevented.

This means that each stacked roll 1 and winding core 2 shown in FIG. 2 can be located clearly by the moving reading/writing device 10, whereby the introduction of the device into the cavities of the cores does not require any high precision.

FIGS. 3 to 6 show arrangements of antennae for winding cores or rolls respectively. These are all suitable for application in the processing of printed products but they are not restricted to this application. They are applicable in an analogous manner for rolls of any kind of goods which are wound onto cores with or without a winding tape.

Figure 3:
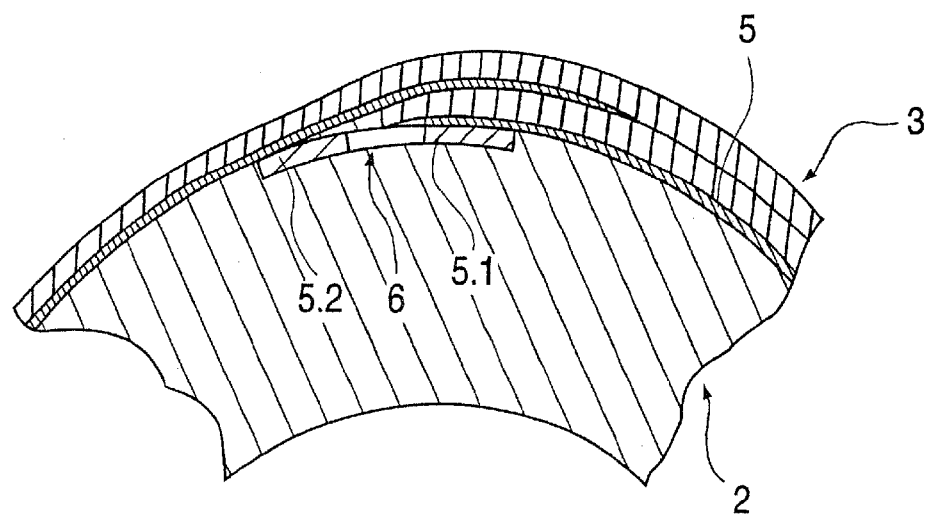
FIGS. 3 and 4 are partial side elevations, in section, of two examples of of antennae which are at least partly arranged on winding the antennae.

The antenna arrangement according to FIG. 3 comprises a connecting piece 6 and an electrically conductive loop 5. The connecting piece 5 is arranged on the winding core and has two loop contact areas 5.1 and 5.2. The loop 5 is e.g. applied to the electrically isolating material of the tape in the form of a metallic coating in the region of the tape end. The coated tape end is fixed to core 2 such that loop 5 is in contact with one (5.1) of the loop contact areas. Loop 5 is at least as long as one circumference of the core such that it contacts the second loop contact area 5.2 of the connecting piece when the winding tape is wound around the core, the connecting piece 6 such closing the antenna loop 5.

Obviously, data stored in an integrated circuit (not shown) arranged between the two loop contact areas 5.1 and 5.2 and contacted with these is only readable if a winding tape with a correspondingly designed antenna loop is wound onto the core. In other words, there is a winding core configuration (without winding tape) in which reading or overwriting respectively are not possible.

The embodiment of the antenna arrangement according to FIG. 3 is especially advantageous for equipping winding cores 2 already in use with electronic means and antenna. It is known to fit a conductive part (e.g. metallic layer) in the end regions of winding tapes for automatic recognition of this end part. For producing winding tapes with antenna loops the same technique is applicable. In addition it is merely necessary to mount, i.e. by gluing, a connecting piece 6 with two loop contact areas 5.1 and 5.2 to the core. Examples of this kind of connecting piece 6 are described in detail in connection with FIGS. 7 and 8.

Figure 4:
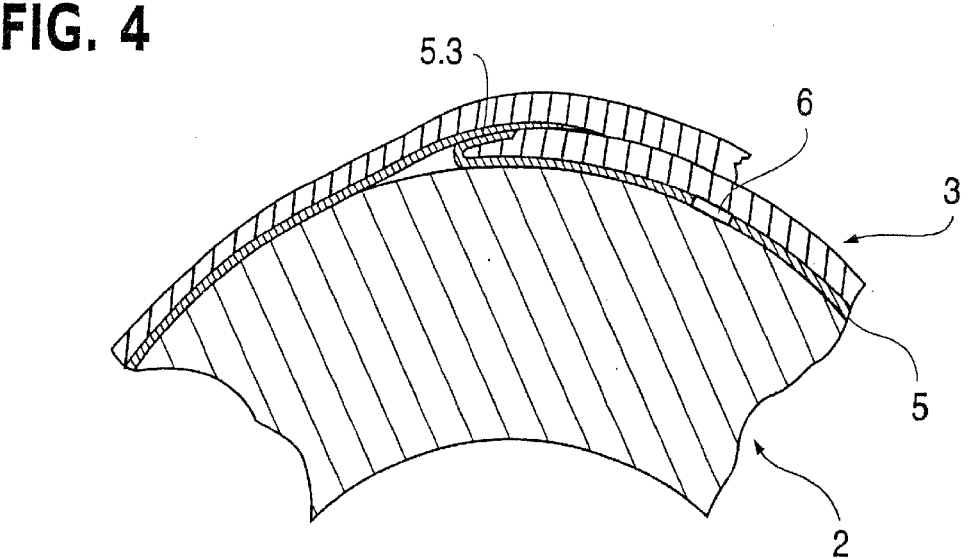

FIG. 4 shows an antenna arrangement with all components (antenna loop 5 and a connecting piece 6) positioned on the winding tape 3. The loop 5 is again e.g. realized as a conductive coating of the tape, whereby the conductive region is at least as long as one circumference of the winding core 2. The conductive region reaches around the end of the tape from its inner side facing the winding core to its other side where it forms a contact area 5.3 for contacting a tape area wound over it. Somewhere on its length, loop 5 is interrupted by a connecting piece 6 or by a corresponding gap, whereby both loop ends are contacted with the integrated circuit in some manner.

The embodiment shown in FIG. 4 is. also applicable to the tape end on the outside of a roll. Loop 5 must then be arranged on the outer surface of the tape, the contact area 5.3 on the inner surface of the tape and the loop must have the length of the circumference of a full roll. It is obvious that this kind of antenna arrangement does not work as soon as the end of the tape, e.g. when being wound or unwound, is loosened from the roll, i.e. the overwriting and/or reading of data is then blocked.

Figure 5:
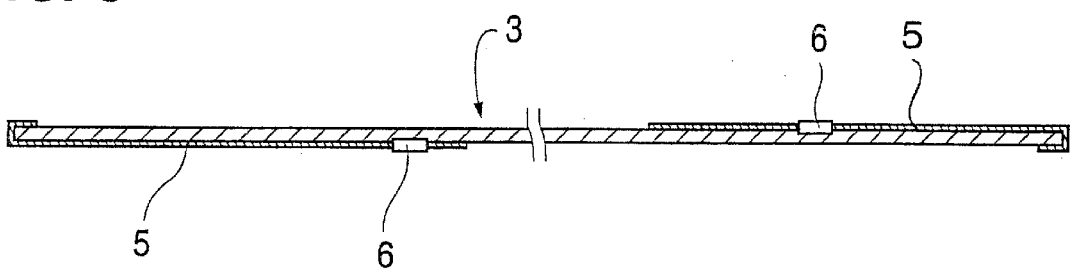
FIG. 5 is a side elevation, in section, of a winding tape with two antennae and two integrated circuits in contact with the antennae.

FIG. 5 shows a longitudinal section of a winding tape which is equipped with an antenna arrangement on both ends each arrangement consisting of an antenna loop 5 and a connecting piece 6. If the lengths of the two loops substantially correspond to the circumference of the winding core to be used the tape can be used for winding in both directions (not depending on which end is placed on the winding core). In both cases a closed antenna loop will be formed around the winding core. If the lengths of both loops substantially correspond to the circumference of a full roll the tape can also be used in both directions and a closed antenna will be formed around the winding core as well as around the circumference of the roll, whereby overwriting or reading respectively of the data of the outer arrangement is blocked during the winding process (loop not closed).

An antenna loop on a winding tape is advantageously arranged in parallel to the longitudinal edges of the tape. This however is not a condition, i.e. the antenna loop can also be arranged obliquely or alternatingly on the tape.

The antenna arrangements according to FIGS. 4 and 5 are restricted to the winding tape, i.e. the winding core merely serves the data transmission function as a forming element. Other elements may serve as forming elements also, whereby the tape equipped with the antenna advantageously also serves another function, e.g. a strapping function. Corresponding applications are e.g. bundles of roll-shaped packages or other objects held together by a corresponding tape, any containers with covers, packed pallets etc. In all these cases the tape advantageously has a double function (strapping function and data transmission function). However it can also be used merely for transmitting data.

Figure 6:
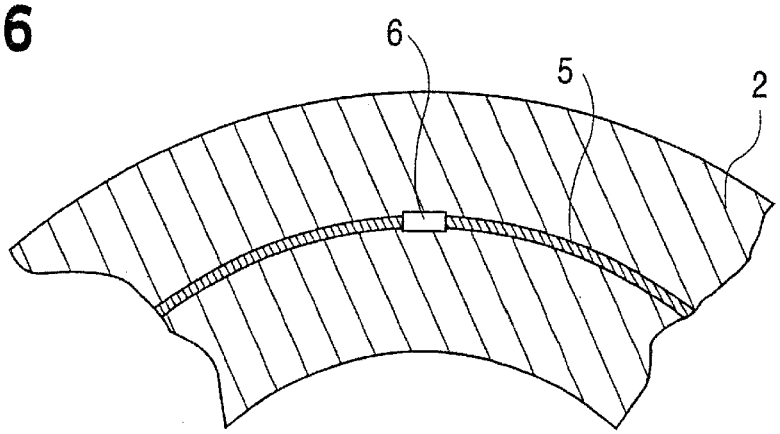
FIG. 6 is a partial side elevation, in section, of a winding core with an integrated antenna.

FIG. 6 shows a section through a winding core 2 with an integrated loop 5 and a connecting piece 6. The antenna loop 5 may run, as shown, in parallel to the faces of the winding core or it may run not parallel.

Figure 7:
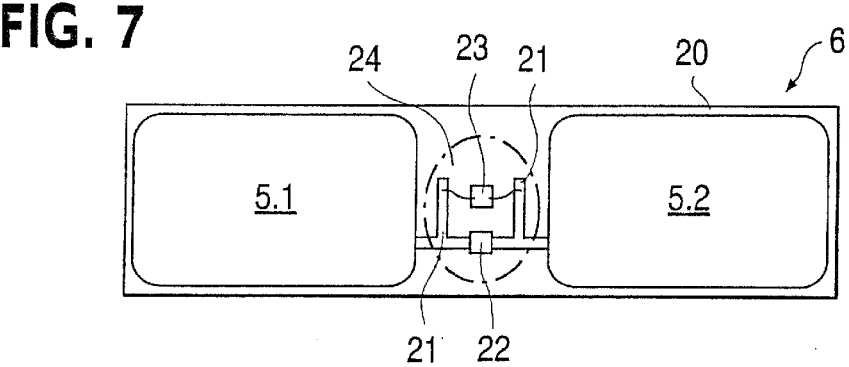
FIGS. 7 and 8 are schematic plan views of two preferred embodiments of connecting pieces for contacting integrated circuit and antenna.
Figure 8:
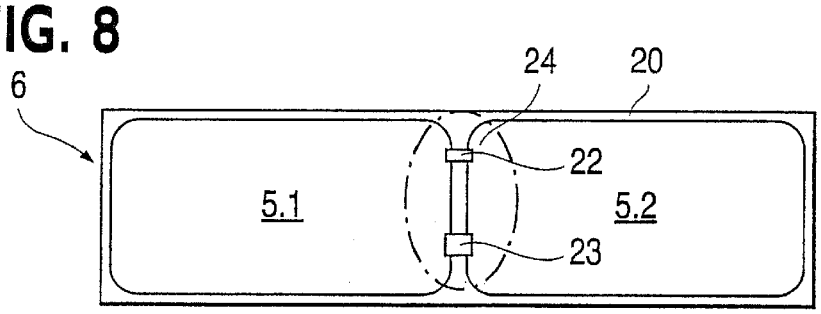

FIGS. 7 and 8 show preferred embodiments of connecting pieces 6. This kind of connecting piece 6 is designed as a printed circuit on a flexible or rigid carrier which printed circuit is equipped with the integrated circuit and possibly with further electronic units (e.g. condensers for tuning or storage of energy or damping resistor).

The connecting piece according to FIG. 7 comprises a printed circuit with two loop contact areas 5.1 and 5.2 on a carrier 20 and further conductors arranged between the contact areas. With these further conductors e.g. a condenser 22 and the integrated circuit 23 are contacted in parallel with the loop contacting areas. The region between the loop contact areas 5.1 and 5.2 is advantageously covered with a protecting lacquer 24.

Connecting piece 6 according to FIG. 8 differs from the connecting piece according to FIG. 7 in that there is no farther conductor 21 which results in the connecting piece being very simple. The printed circuit merely comprises two loop contact areas 5.1 and 5.2 which are at such a small distance from each other that the condenser 22 as well as the integrated circuit 23 can be positioned directly on the loop contact areas 5.1 and 5.2 and fixed with a conductive glue or by soldering.

Typical dimensions for connecting piece 6 for an application according to FIGS. 1 to 6 are e.g.: thickness of the conductive areas (5.1, 5.2, 21): 20 to 35 $\mu$m; width of the loop contact areas (5.1 and 5.2): 20 to 40 mm; thickness of the rigid or flexible carrier (20): 20 to 50 $\mu$m.

For an easy assembly of conductive loop 5 and connecting piece 6 e.g. on a winding tape (application according to FIG. 4 or 5) or on a different object it is advantageous to use connecting pieces 6 with electrically conductive and adhesive pieces of film stuck to the loop contact areas 5.1 and 5.2, which pieces of film are protected by a peelable protecting film. The conductive loop in form of a wire or metal strip or in form of a conductive coating is applied to the object. The protective films are removed from the loop contact areas of the connecting piece which is then stuck across the gap between the ends of the loop such that the two ends of the loop are in contact with the loop contact areas (through the adhesive and conductive film).

Obviously, it is also conceivable that the whole antenna is produced, in the same manner as shown in FIGS. 7 and 8, by designing one of the loop contact areas 5.1 and 5.2 to be considerably longer than the other such that the two loop contact areas form the whole length of the loop. For assembly, this elongated connecting piece is glued around an object and its end regions are contacted with each other conductively with suitable means.

FIGS. 9 to 12 show as further examples of inventive movable objects, containers 30 and 30' with covers 31 and 31' (FIGS. 9 and 10) such as are e.g. applicable for storage or shipping, an open container 35 (FIG. 11) such as is e.g. applicable for commissioning and an e.g. standardized pallet 40 (FIG. 12) such as is usable for various applications especially for transport and intermediate storage.

Figure 9:
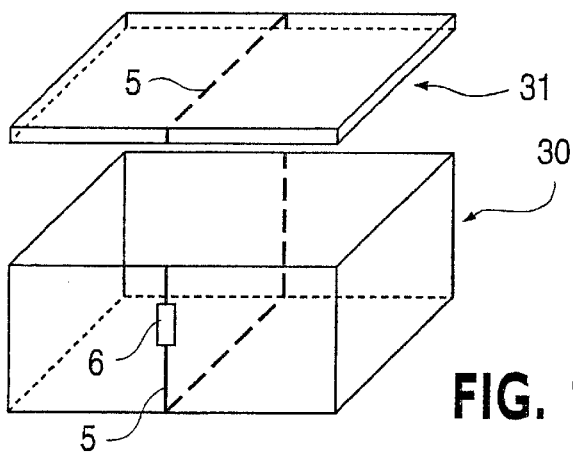
FIGS. 9 to 12 are simplified schematic perspective view of further embodiments of the inventive movable object.

The container according to FIG. 9 e.g. comprises a loop which extends over the outer side of container 30 across one container wall, across the container base and across the opposite container wall then continuing on the inner side of the cover 31. Only when the container is closed with the cover 31 the loop is closed also and the stored data can be read or overwritten respectively.

The bottom of container 30 is e.g. rectangular. If the antenna area is arranged in the middle of this rectangle the cover 31 can be applied in both possible positions in both cases closing the antenna loop 5. For a reading/writing process, the container 30/31 can have any relative position to a reading/writing device with a main reading direction orientated substantially parallel to the container base except for a position in which the main reading direction and the antenna area are parallel. In particular, the containers can be rotated by 180° without the position of the antenna being changed.

Figure 10:
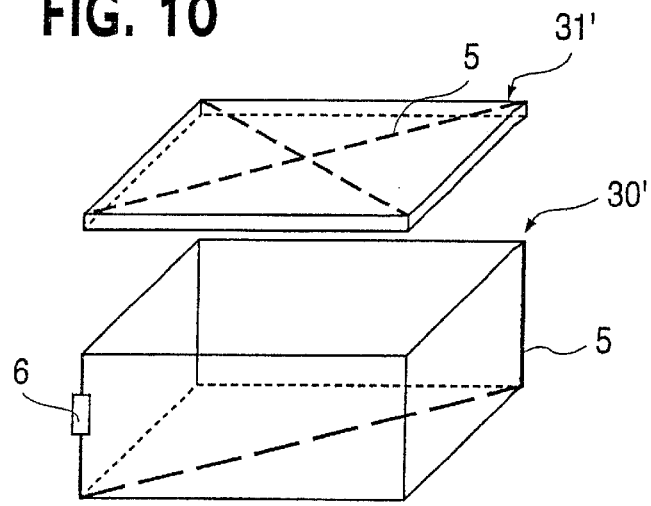

FIG. 10 shows a container 30' with cover 31' similar to the container with cover (30/31) shown in FIG. 9. The difference is that in the container according to FIG. 10 the antenna area is perpendicular to the base and runs diagonally to it. For the cover 31' to be applicable in both possible positions without any influence on the antenna there are two pieces of loop on the cover running along one diagonal each. It is also possible that instead of the piece of loop on the cover the one in the container is doubled (on both diagonals).

If a group of containers according to FIG. 10 is arranged on a line on a substantially horizontal support and is inspected by a reading/writing device (e.g. by moving the containers past a stationary device), whereby the main reading direction is substantially horizontal and perpendicular to the line of containers, all containers closed with covers are noted by the inspection whatever position their walls have and whatever their size is. Only containers which are orientated with their diagonal parallel to the main reading direction are not "seen" (antenna area parallel to main reading direction). This position can however be prevented easily by gently pushing against wall running parallel to the line of containers.

Figure 11:
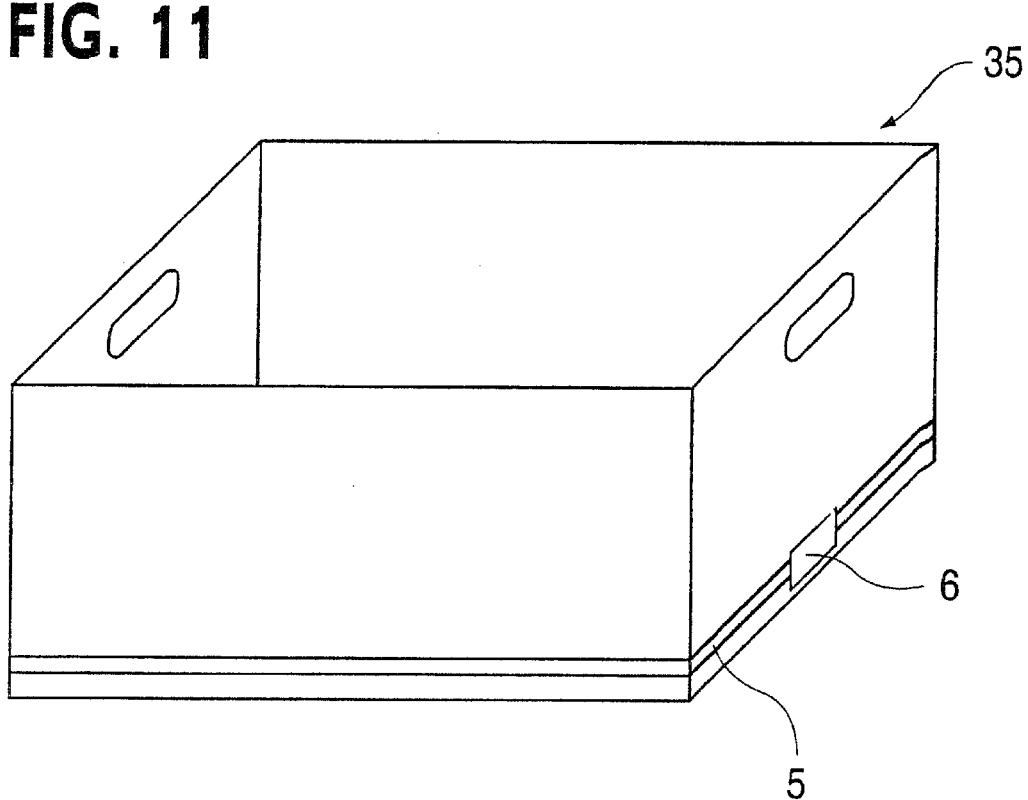

FIG. 11 shows an open container 35 with an e.g. square base as a further embodiment of the inventive movable object. The antenna arrangement (loop 5 and connecting piece 6) is arranged substantially parallel to the container base on the outside (or inside) of the container walls. The antenna area defined by loop 5 allows any position of rotation of the container standing on its base without changing the reading/writing characteristics at an unchanging main reading direction (e.g. vertical).

Figure 12:
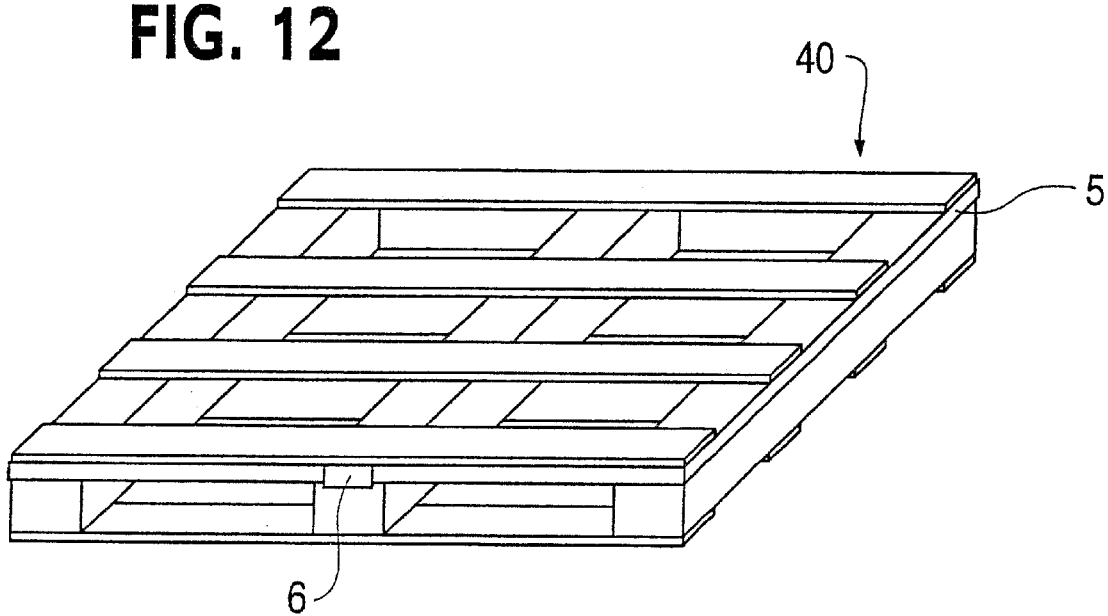

FIG. 12 shows, as a further example of an inventive movable object, a pallet with an antenna loop 5 which extends around its lateral sides substantially in parallel with the loading area of the pallet.

What is claimed is:

1. A system for locating relative positions of objects and identifying the objects comprising:

a plurality of objects each carrying an integrated circuit storing data, said objects being freely movable within said system and relative to each other and being arranged in stacks or rows on a supporting surface, each of said objects having an antenna loop spaced from a surface of said object and defining a planar antenna area parallel or perpendicular to said supporting surface, wherein each said objects comprises a container having an openable cover and a rectangular base, one part of said antenna loop being mounted on said cover and a remaining part of said loop being mounted on said container such that said antenna area is perpendicular to said base with said loop extending diagonally across said base, said parts of said antenna loop being electrically connected together when said cover is closed, and said antenna loops of objects in a stack being superimposed;

at least one reading/writing device for contactless reading of data from said objects, one of said at least one reading/writing device and each said stack or row being movable relative to the other of said stack or row and said at least one reading/writing device with a reading direction oriented perpendicular to the relative movement to permit reading by said reading/writing device of data carried by said objects in said stack or row; and means for correlating each position of said reading/writing device relative to said stack or row with data read from an object at said position to thereby define a position of each object and an identification of said object by the stored data.

2. A system according to claim 1 wherein said cover is removable from said container, said antenna area is parallel with a diagonal of said base and said container comprises two loop parts extending across said base along two diagonals of said base.

3. A system according to claim 1 wherein said cover is removable from said container, said antenna area is parallel with a diagonal of said cover and said cover comprises two loop parts extending across said cover along two diagonals of said cover.

4. A system according to claim 1 wherein said antenna loop includes a gap and said integrated circuit is mounted in said gap.

5. A system according to claim 4 including a tape connecting piece having two spaced-apart loop contact areas, said integrated circuit being mounted on said connecting piece.

6. A system according to claim 5 wherein said connecting piece comprises a printed circuit on a carrier, said printed circuit including said integrated circuit.

7. A system according to claim 5 wherein said loop connecting pieces are elongated and comprise the entire loop when electrically connected together.

8. A system according to claim 1 wherein said loop comprises a metal tape oriented substantially perpendicular to said antenna area.

* * * * *